US012609334B2

(12) United States Patent
Stammsen et al.

(10) Patent No.: US 12,609,334 B2
(45) Date of Patent: Apr. 21, 2026

(54) CONNECTION BLOCK

(71) Applicant: Robert Bosch GmbH, Stuttgart (DE)

(72) Inventors: Guido Stammsen, Stuttgart (DE);
Viktor Friedrich, Sersheim (DE)

(73) Assignee: Robert Bosch GmbH, Stuttgart (DE)

( * ) Notice: Subject to any disclaimer, the term of this patent is extended or adjusted under 35 U.S.C. 154(b) by 503 days.

(21) Appl. No.: 18/149,276

(22) Filed: Jan. 3, 2023

(65) Prior Publication Data

US 2023/0216069 A1 Jul. 6, 2023

(30) Foreign Application Priority Data

Jan. 5, 2022 (DE) ..................... 10 2022 200 038.2

(51) Int. Cl.
G01D 11/24 (2006.01)
H01M 8/04007 (2016.01)
H01M 8/04029 (2016.01)
H01M 8/0432 (2016.01)
H01M 8/0438 (2016.01)

(52) U.S. Cl.
CPC ... H01M 8/04029 (2013.01); H01M 8/04067 (2013.01); H01M 8/04358 (2013.01); H01M 8/04417 (2013.01)

(58) Field of Classification Search
None
See application file for complete search history.

(56) References Cited

U.S. PATENT DOCUMENTS

2001/0032747 A1 10/2001 DePoy et al.

FOREIGN PATENT DOCUMENTS

| CN | 213116257 U | * | 5/2021 |
| DE | 102017207477 A1 | | 11/2018 |
| DE | 102018219069 A1 | | 5/2020 |
| DE | 102020203650 A1 | | 9/2021 |
| DE | 102021120155 A1 | | 2/2022 |
| EP | 1565652 B1 | | 4/2012 |

OTHER PUBLICATIONS

English translation of CN-213116257-U (Year: 2021).*

* cited by examiner

*Primary Examiner* — Alexander A Mercado
(74) *Attorney, Agent, or Firm* — Michael Best & Friedrich LLP

(57) ABSTRACT

A connection block including connections, which are connected to one another by connection channels. The connection block includes at least two fluid paths, which extend independently from one another through the connection block, which are each provided with a branching, and which each comprise a fluid inlet connection, a first fluid outlet connection and a second fluid outlet connection. For or each fluid path, at least one temperature sensor for measuring a temperature in the fluid path and/or at least one pressure sensor for measuring a pressure in the fluid path are provided.

12 Claims, 3 Drawing Sheets

Fig. 1

CONNECTION BLOCK

BACKGROUND

The invention relates to a connection block comprising connections connected to one another by connection channels. The connection block is preferably used in a cooling system of a fuel cell system.

From European patent specification EP 1 565 652 B1, a connection block for a hydrostatic piston machine is known, which is provided for simultaneous operation in a first hydraulic circuit and a second hydraulic circuit.

SUMMARY

There is a need to simplify the representation of connections, particularly cooling connections, in a complex system, particularly in a fuel cell system, with regard to production and assembly, wherein it must be taken into account that pressure and/or temperature should also be monitored. This is in particular required for controlling the fuel cell system.

The invention provides a connection block with the features of claim 1. Preferred embodiments are the subject matter of the dependent claims.

Accordingly, the disclosure provides a connection block with connections connected to one another by connection channels. The connection block comprises at least two fluid paths, which extend independently from one another through the connection block and in each case are provided with a branching, and which in each case comprise a fluid inlet connection, a first fluid outlet connection and a second fluid outlet connection. For each fluid path, at least one temperature sensor is provided for measuring a temperature in the fluid path and/or at least one pressure sensor is provided for measuring a pressure in the fluid path.

The fluid is preferably a cooling medium, in particular a liquid coolant used for cooling a fuel cell stack. Via the branching, the coolant may also be advantageously used in further components of the fuel cell system, such as a hydrogen heat exchanger and/or an intermediate air cooler. By integrating a temperature sensor and/or a pressure sensor directly into the connection block, the installation space can be optimized. A particularly compact system is obtained. In particular, additional connections for the temperature sensor and/or pressure sensor in the fluid path outside of the connection block may be omitted.

The measured temperature values measured by the temperature sensor and/or the measured pressure values measured by the pressure sensor may be output to a control device for controlling a fuel cell system in which the connection block is used. The control device may, as is known, control the pressure and/or the temperature, wherein the measured values of the temperature sensor and/or of the pressure sensor must be taken into account.

Advantageously, the claimed design of the connection block can shift a portion of the complexity of a complex overall system, such as a fuel cell system, from the outside into the connection block. In particular, at least a portion of the sensor system can likewise be integrated into the connection block. This has the advantage, among other things, that the number of external interfaces can be reduced. By integrating the fluid paths into a single connection block, undesirable leakage to the environment is minimized. In addition, an assembly situation is simplified, in particular in the event that the connection block or the fuel cell system with the connection block is mounted entirely or partially at different locations. In the cooling of the fuel cell system, the connection block is passed through at relatively large flow rates, in particular at flow rates of up to two hundred liters per minute. The magnitude of the flow rate depends on the cooling capacity. As a result of the claimed connection block, undesirably high pressure losses can be kept low even at these large flow rates. In addition, the cooling medium guidance in the connection block can be permanently optimized during production, in particular by means of a suitable production process and/or a corresponding processing.

In a preferred exemplary embodiment of the connection block, exactly one temperature sensor and exactly one pressure sensor are provided for each fluid path. As a result, the minimum number of sensors can be used to determine both the temperature and the pressure required to control the fuel cell system.

The temperature sensors and/or pressure sensors are preferably selected to be compatible with a particular fluid that is to flow through the connection block. In particular, some material resistance of the temperature sensors and/or pressure sensors is required.

In a preferred exemplary embodiment of the connection block, the fluid inlet connection and the first fluid outlet connection are connected to one another via a main channel from which a secondary channel to the second fluid outlet connection branches off at the branching. The at least one temperature sensor may be designed to measure a temperature in the main channel and/or may be designed to measure a pressure within the main channel. Although the two fluid paths are independent from one another, they otherwise perform the same function. The fluid, in particular the cooling medium, is preferably conveyed using a pump. Each fluid path, in particular each main path, is associated with its own fluid conveying means, in particular a pump. This simplifies the control of a complex overall system consisting of several subsystems, in particular a fuel cell system comprising several fuel cell subsystems. Via the independent fluid paths and the respectively associated fluid conveying means, in particular pumps, each subsystem, in particular each fuel cell subsystem, can be controlled or regulated individually. By measuring the temperature and/or the pressure directly in the main channel, during use in a fuel cell system, the exact temperature of the coolant or the exact pressure of the coolant in the main channel can be determined, wherein the coolant flows through the main channel. Falsification of the measured values by a flow from the secondary channel can be prevented by connecting the secondary channel downstream of the temperature sensor and pressure sensor positioned in the main channel. The measured values for temperature and/or pressure may thus be used to control the fuel cell system.

In a further exemplary embodiment of the connection block, the main channel comprises a straight inlet portion, which extends from the fluid inlet connection to the branching of the secondary channel and is angled at an obtuse angle from a straight outlet portion that extends from the branching of the secondary channel to the first fluid outlet connection. The at least one temperature sensor and/or the at least one pressure sensor are arranged at least partially in the straight inlet portion. The obtuse angle between the two portions of the main channel provides, among other things, the advantage that the flow of the fluid, in particular of the cooling medium, through the main channel is only insignificantly impaired. The obtuse angle is preferably greater than one hundred and twenty degrees. In a preferred exemplary embodiment, the obtuse angle is about one hundred and thirty degrees.

According to a further exemplary embodiment of the connection block, the inlet connections run straight to the outlet connections, i.e., designed to lie on an axis.

In a further exemplary embodiment of the connection block, the secondary channel extends from the branching straight to the second fluid outlet connection. The straight geometry of the secondary channel simplifies the assembly situation when connecting fluid lines, in particular coolant lines, and when connecting the at least one temperature sensor and/or at least one pressure sensor. The secondary channel preferably extends at an obtuse angle to the main channel, in particular to both portions of the main channel. The angle is advantageously designed to optimize flow.

In a further exemplary embodiment of the connection block, the main channel has a larger flow cross-sectional area than the secondary channel. Thus, a main flow rate can be conveyed through the main channel that is advantageously larger than a secondary flow rate conveyed through the secondary channel. This has proven advantageous in terms of the desired application in a complex system, such as a cooling system of a fuel cell system.

In a further exemplary embodiment of the connection block, the fluid paths extending independently from one another through the connection block are designed to be of the same length. Here, it is deliberately accepted that the connection block will require a larger installation space. The same lengths of the fluid paths simplify the control, in particular cooling, in a complex system, in particular a fuel cell system comprising several fuel cell subsystems.

In a further exemplary embodiment of the connection block, the fluid inlet connection and the first fluid outlet connection are designed identically. This provides the advantage during assembly that connection errors are largely excluded. The connection geometries of the connections are advantageously standardized. Particularly preferred are connection geometries according to the German Industry Standard, in particular according to DIN 3021-A, or according to VDA, wherein the capital letters VDA refer to an abbreviation for the German Association of the Automotive Industry.

In a further exemplary embodiment of the connection block, the second fluid outlet connection is different from the first fluid outlet connection. For example, the second fluid outlet connection may be simpler than the first fluid outlet connection and the fluid inlet connection. As a result of the different designs of the fluid outlet connections, an incorrect connection during assembly can be reliably ruled out in this case.

In another exemplary embodiment of the connection block, the connection block comprising the two fluid paths extending independently from one another through the connection block is formed from one piece. This simplifies the production of the connection block and the connection of fluid lines to the connection block. With regard to the above-described application of the connection block in the cooling of a complex fuel cell system, specific metals, such as wrought aluminum alloys or stainless steel, have proven to be advantageous.

In a further preferred exemplary embodiment of the connection block, the connection block comprises at least one fastening region, which allows stable fastening of the connection block to a supporting structure. For example, the supporting structure is a type of frame to which different components of the fuel cell system, in particular of components of several subsystems of the fuel cell system, are fastened. The fastening region comprises, for example, through-holes or blind holes which are advantageously provided with a thread.

The secondary channel provides fluid, in particular cooling medium, for further components, such as a hydrogen heat exchanger and/or an intermediate air cooler. The fuel cell system preferably comprises several fuel cell subsystems, for example two or three fuel cell subsystems.

In the connection block, an independent fluid path comprising a main channel and a secondary channel is advantageously provided for each of the fuel cell subsystems. Each fluid path is associated with its own fluid conveying means, particularly its own pump.

BRIEF DESCRIPTION OF THE DRAWINGS

Further advantages, features and details of the invention arise from the following description, in which various exemplary embodiments are described in detail with reference to the drawing.

Here:

FIG. 1 shows a schematic representation of a cooling system of a fuel cell system;

DETAILED DESCRIPTION

Figure 1:
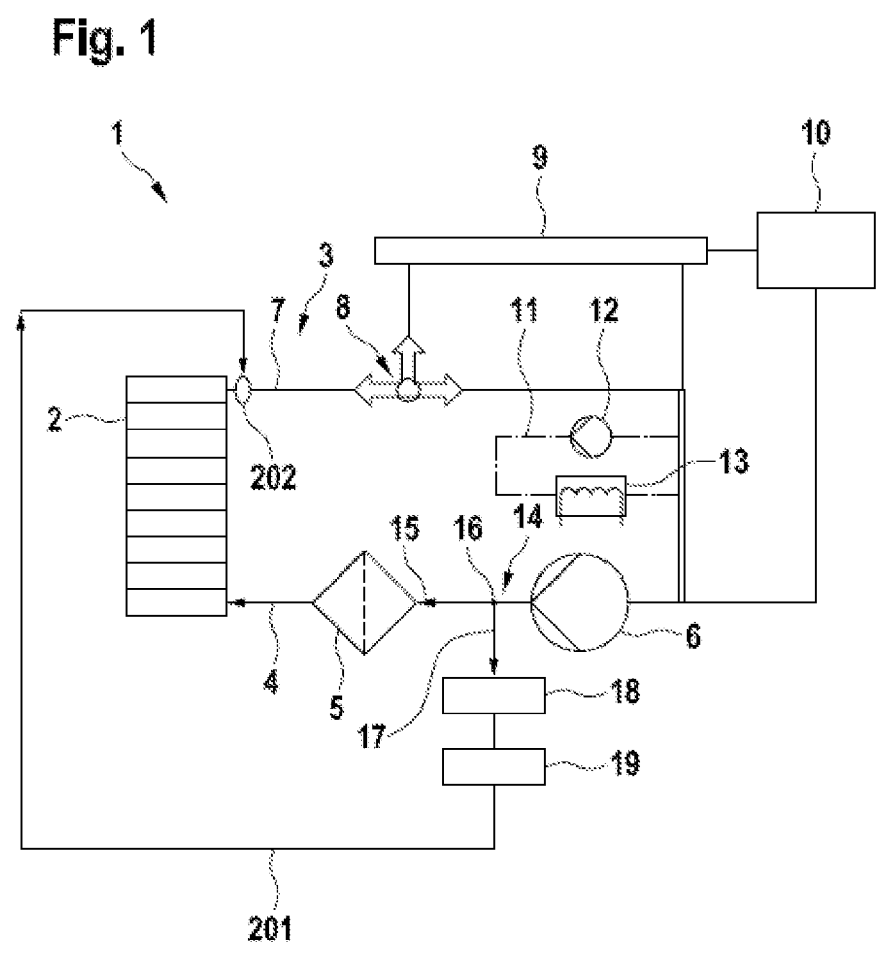
Figure 2:
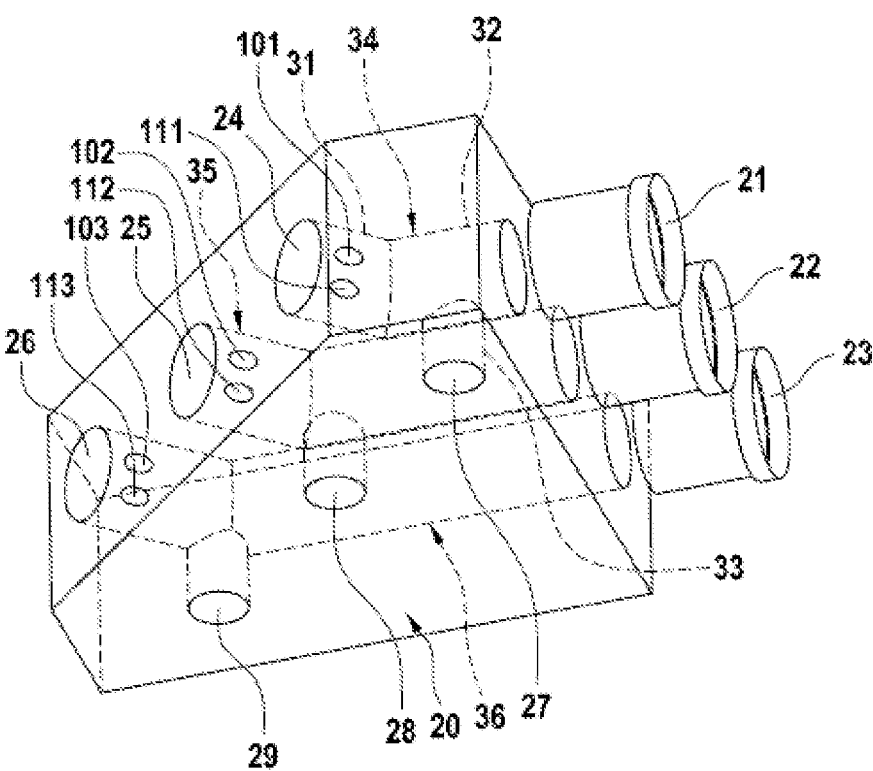
FIG. 2 shows a perspective and partially translucent representation of a connection block according to one embodiment of the invention, with three independent fluid paths, each comprising a main channel from which a secondary channel branches off.

In FIG. 1, a fuel cell subsystem 1 is shown schematically. The fuel cell subsystem 1 comprises a fuel cell stack 2 with a cooling system 3. The fuel cell subsystem 1 is constructed similarly to fuel cell systems described, for example, in the German published patent applications DE 10 2017 207 477 A1 and DE 10 2018 219 069 A1, the entire contents of which are hereby incorporated by reference herein. As will be discussed below, a connection block 20, 40 according to the disclosure is used with the fuel cell subsystem 1.

An arrow 4 in FIG. 1 indicates that a cooling medium, which is, for example, liquid, is supplied to the fuel cell stack 2 for cooling purposes. The cooling medium is supplied to the fuel cell stack 2 via a filter device 5 with the aid of a pump 6. An arrow 7 indicates the cooling medium discharged from the fuel cell stack 2.

Via a valve 8, the cooling medium discharged from the fuel cell stack 2 can be directed through a radiator 9. The discharged cooling medium can also be conveyed past the radiator 9 in a bypass-like manner via the valve 8. An expansion tank 10 is connected to the radiator 9 and to an inlet of the pump 6.

If necessary, the cooling medium can be brought to the right temperature, in particular heated, in an auxiliary path 11. The auxiliary path 11 comprises an auxiliary pump 12 and a heating device 13.

An arrow between the pump 6 and the filter device 5 indicates a fluid path 14. The fluid path 14 comprises a main path 15 with a branching 16. The main path 15 connects an outlet of the pump 6 to the filter device 5.

A secondary path 17 branches off from the branching 16. For example, via the secondary path 17, a hydrogen heat exchanger 18 and an intermediate air cooler 19 are supplied with fluid medium. The hydrogen heat exchanger 18 is connected in series with the intermediate air cooler 19.

A fuel cell system used to drive a commercial vehicle, for example a truck, comprises two or three fuel cell subsystems 1. Each of the fuel cell subsystems, such as the fuel cell subsystem 1 in FIG. 1, is equipped with a separate fluid path 14.

Each of the fluid paths 14 comprises a main path 15 and a secondary path 17 branched off from the main path 15 at a branching 16. According to the invention, the two or three fluid paths 14 are conveyed independently from one another through a common connection block 20; 40.

Furthermore, a fluid path 202 is provided, comprising a main path from fuel cell stack 2 and a secondary path from hydrogen heat exchanger 18 and intermediate air cooler 19.

The fluid path 14 corresponds to a first possible position for installing the connection block according to the invention. The connection block is advantageously arranged between a fluid conveying means, in particular the pump 6, and the filter device 5, in particular a particulate filter, in a cooling system of a fuel cell system. The connection between an outlet of the fluid conveying device, in particular the pump 6, and the filter device 5 represents the main channel in the connection block.

The fluid path 202 corresponds to a second possible position of the connection block according to the invention. The connection block is advantageously arranged between the fuel cell stack 2 and the 3/2-way valve 8 in a cooling system of a fuel cell system. The connection between an outlet of the fuel cell system 2 and the 3/2-way valve 8 represents a main channel in the connection block.

FIG. 2 shows a connection block, for example for use in the first position 14. It can be seen that the connection block comprises three fluid inlet connections 21 to 23, three first fluid outlet connections 24 to 26, and three second fluid outlet connections 27 to 29. The fluid inlet connections 21 to 23 and the fluid outlet connections 24 to 29 are also in short referred to as inlet connections and outlet connections.

The connection block 20 comprises three fluid paths 34, 35, 36, which extend independently from one another through the connection block 20. Each of the fluid paths 34 to 36 comprises a main channel 31 comprising a branching 32 where a secondary channel 33 is branched off.

The main channel 31 of the fluid path 34 connects the fluid inlet connection 21 to the first fluid outlet connection 24. The secondary channel 33 of the fluid path 34 extends from the branching 32 to the second fluid outlet connection 27.

The fluid paths 35, 36 also each comprise a main channel comprising a branching and a secondary channel.

The fluid inlet connections 21 to 23 are each associated with an outlet of a pump. The first fluid outlet connections 24 to 26 are each associated with a filter device 5. The second fluid outlet connections 27 to 29 are each associated with a hydrogen heat exchanger 18 and an intermediate air cooler 19.

For each of the three fluid paths 34, 35, 36, a temperature sensor 101, 102, 103 and a pressure sensor 111, 112, 113 are respectively provided, which measure a temperature or a pressure in the respective fluid paths 34, 35, 36 and output a signal. The signal may be received, for example, by a control device of a fuel cell system, which, for example, controls the pressure and/or the temperature in the fluid paths accordingly. Pressure and temperature sensors are each positioned downstream of the branch to the secondary circuit so that the sensors only sense the state of the fluid toward the stack, i.e., without influence of the secondary path.

Figure 3:
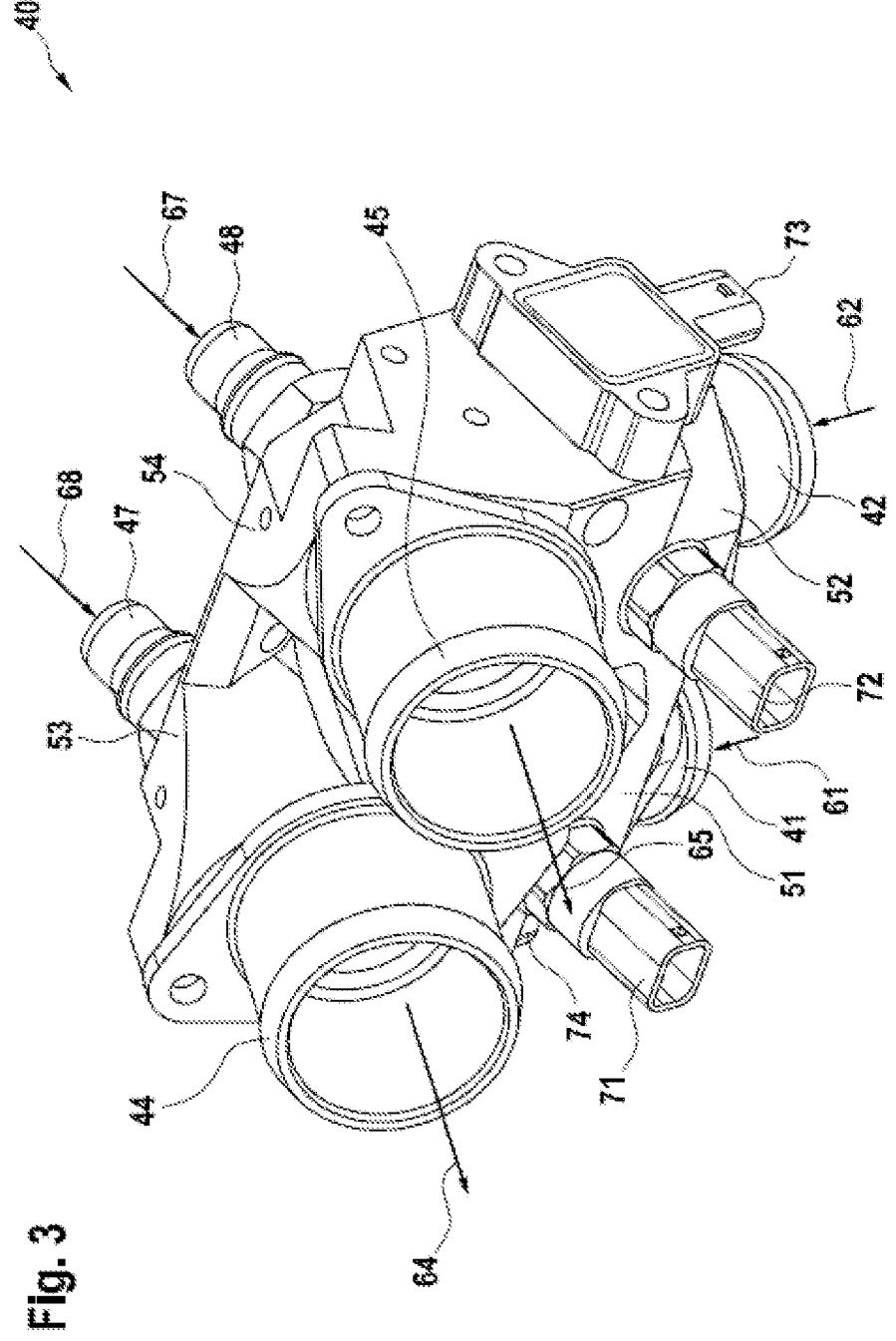
FIG. 3 shows a second exemplary embodiment of a connection block according to one embodiment of the invention, with two independent fluid paths.

In contrast to FIG. 2, the connection block 40 shown in FIG. 3, for example for use in the second position 202, comprises only two independent fluid paths (not denoted in more detail), each comprising a branching. A first fluid path connects an inlet connection 41 to a first outlet connection 44 and a second outlet connection 47. A second fluid path connects an inlet connection 42 to a first outlet connection 45 and a second outlet connection 48.

The first fluid path comprises a main channel 51 from which a secondary channel 53 is branched off. The second fluid path comprises a main channel 52 from which a secondary channel 54 is branched off.

The main channel 51 connects the inlet connection 41 to the first outlet connection 44. The main channel 52 connects the inlet connection 42 to the first outlet connection 45.

The directional arrows 61, 62; 64, 65; 67, 68 indicate different portions of the main channels 51, 52 and of the secondary channels 53, 54.

Inlet portions 61, 62 of the main channels 51, 52 are each arranged at an obtuse angle of approximately one hundred and thirty degrees to outlet portions 64, 65 of the main channels 51, 52.

Outlet portions 67, 68 of the secondary channels 53, 54 are each arranged at an obtuse angle of approximately one hundred and five degrees to the inlet portions 61, 62 of the main channels 51, 52.

The connection block 40 is designed in one piece and is equipped with a fastening region (not shown), which may, for example, comprise blind holes with a thread. With the aid of suitable fastening screws, the connection block 40 can then be easily stably fastened to a supporting structure of the fuel cell system.

The inlet connections 41, 42 and the first outlet connections 44, 45 are designed as standard connections, for example in accordance with German industry standard 3021-A. The second outlet connections 47, 48 are, for example, equipped with a connection geometry according to VDA or according to a standard designated SAE J2044.

For each of the three fluid paths, a temperature sensor 71, 72 and a pressure sensor 73, 74 is respectively provided, which measure a temperature or a pressure in the respective fluid paths and output a signal. The signal may be further processed by a control device of a fuel cell system, for example.

The invention claimed is:

1. A fuel cell subsystem (1) comprising a fuel cell stack (2) and a cooling system (3) adapted to recirculate a supply of a cooling medium throughout the fuel cell subsystem (1) to cool the fuel cell stack (2), the cooling system (3) including a pump (6), a filter device (5), a hydrogen heat exchanger (18), and a connection block (20:40), the connection block (20:40) having a body with connections (21-29; 41,42,44,45,47,48), which are connected to one another by connection channels (31,33;51-54) defined by respective bores extending through the body, the connection channels (31,33;51-54) extending independently from one another through the connection block (20;40) to define respective independently extending fluid paths (14;34-36), wherein each connection channel is provided with a branching (16;32) and includes a fluid inlet connection (21-23;41, 42), a first fluid outlet connection (24-26;44,47) and a second fluid outlet connection (27-29;47,48); wherein each connection channel includes at least one temperature sensor (71,72;101;102) for measuring a temperature in the fluid path and/or at least one pressure sensor (73,74;111,112) for measuring a pressure in the fluid path (14;34-36), wherein the fluid inlet connection (21-23;41,42) is in fluid communication with an outlet of the pump (6), wherein the first fluid outlet connection (24-26;44,47) is in fluid communication with the filter device (5), and wherein the second fluid outlet connection (27-29;47,48) is in fluid communication with the hydrogen heat exchanger (18).

2. The fuel cell subsystem of claim 1, wherein exactly one temperature sensor (71,72;101;102) and exactly one pressure sensor (73,74;111,112) are provided for each fluid path (14;34-36).

3. The fuel cell subsystem of claim 1, wherein the fluid inlet connection (21-23;41,42) and the first fluid outlet connection (24-26;44,45) are connected to one another via a main channel (31;51,52) from which a secondary channel (33;53,54) to the second fluid outlet connection (27-29;47, 48) is branched off at the branching (32).

4. The fuel cell subsystem of claim 3, wherein the at least one temperature sensor (71,72;101;102) is designed to measure a temperature in the main channel (31;51,52) and/or the at least one pressure sensor (73,74;111,112) is designed to measure a pressure within the main channel (31;51,52).

5. The fuel cell subsystem of claim 3, wherein the main channel (51,52) comprises a straight inlet portion, which extends from the fluid inlet connection (41,42) to the branching (32) of the secondary channel (53,54) and is angled at an obtuse angle from a straight outlet portion that extends from the branching (32) of the secondary channel (53,54) to the first fluid outlet connection (44,45), wherein the at least one temperature sensor (71,72;101;102) and/or the at least one pressure sensor (73,74;111,112) are arranged at least partially in the straight inlet portion.

6. The fuel cell subsystem of claim 3, wherein the secondary channel (53,54) extends from the branching (32) straight to the second fluid outlet connection (47,48).

7. The fuel cell subsystem of claim 3, wherein the main channel (51,52) has a larger flow cross-sectional area than the secondary channel (53,54).

8. The fuel cell subsystem of claim 1, wherein the fluid paths (14;34-36) extending independently from one another through the connection block (20;40) are of the same length.

9. The fuel cell subsystem of claim 1, wherein the connection block (20;40) is formed from one piece with the at least two fluid paths (34-36;14;51,52) extending independently from one another through the connection block (20;40).

10. The fuel cell subsystem of claim 1, wherein the connection block (40) comprises at least one fastening region that allows a stable fastening of the connection block (40) to a supporting structure.

11. The fuel cell subsystem of claim 1, wherein the connection block (20;40) is positioned between an outlet of the pump (6) and the filter device (5).

12. The fuel cell subsystem of claim 1, wherein the cooling system (3) further includes an intermediate air cooler (19), wherein the intermediate air cooler (19) is connected in series with the hydrogen heat exchanger (18).

* * * * *